United States Patent Office 2,777,305
Patented Jan. 15, 1957

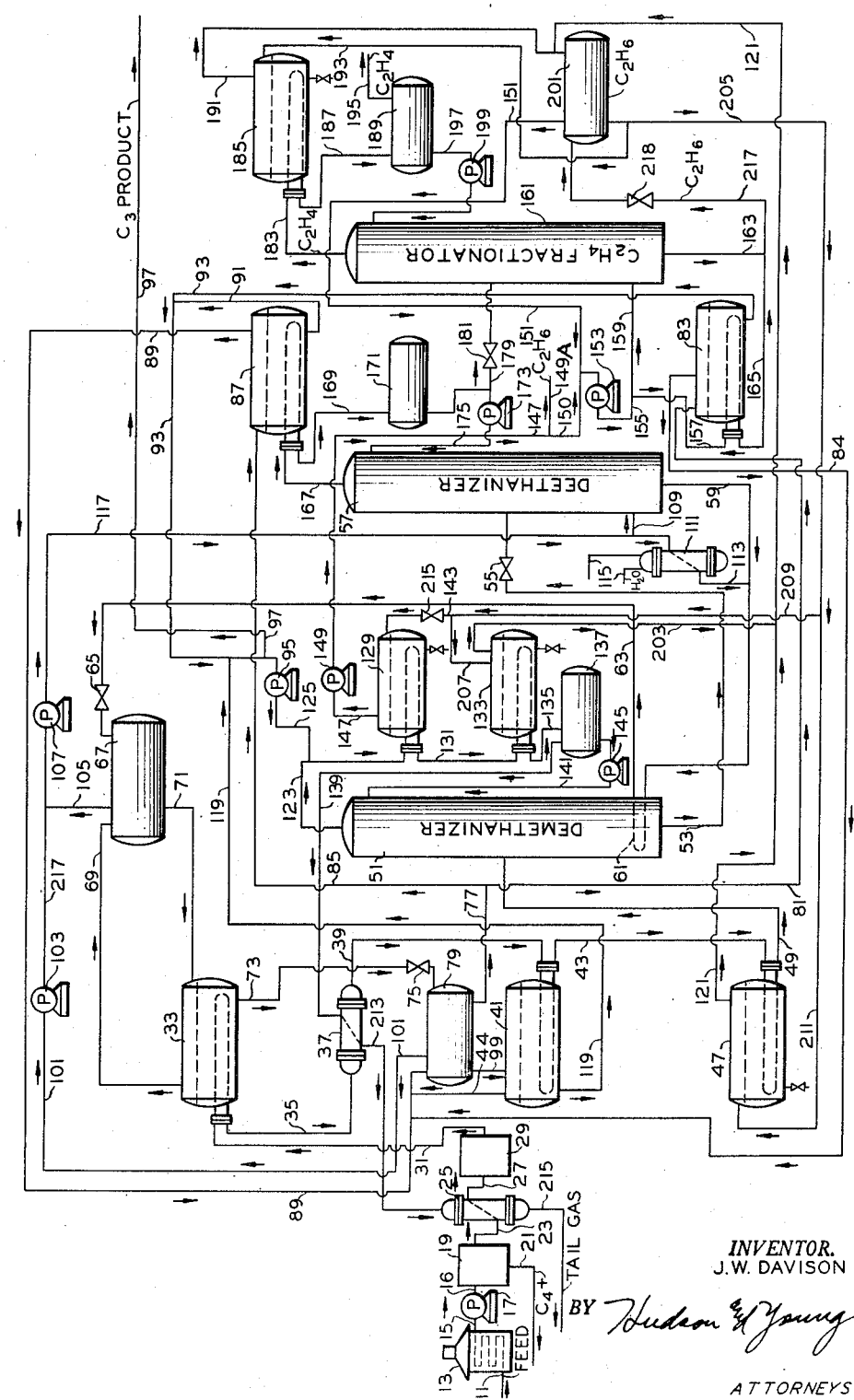

2,777,305

SEPARATION AND RECOVERY OF ETHYLENE

Joseph W. Davison, Bartlesville, Okla., assignor to Phillips Petroleum Company, a corporation of Delaware Application December 28, 1953, Serial No. 400,527

8 Claims. (Cl. 62—175.5)

This invention relates to a method for the separation and recovery of ethylene from mixtures of hydrocarbons containing ethylene. In one aspect it relates to a method for the separation and recovery of ethylene from effluent vapors from a hydrocarbon cracking operation. In another aspect it relates to a method for the separation and recovery of ethylene from effluent vapors from a butane cracking operation.

I have devised a method for the separation and recovery of ethylene from cracked vapors resulting from a butane cracking operation in which $C_2$ and $C_3$ hydrocarbons are concentrated in a deethanizing operation involving the use of a stream of liquid $C_3$ hydrocarbons as an absorbent. The process also involves utilization of a stream of liquid ethane and a stream of liquid $C_3$ hydrocarbons as refrigerants and especially wherein the liquid $C_3$ hydrocarbon stream is cooled by self refrigeration in an internal cycle in which a substantial proportion of the heat is removed from the $C_3$ hydrocarbons by using them to reboil directly a deethanizer and to reboil indirectly the demethanizer, in addition a stream of liquid ethane from an ethylene fractionator bottoms is cooled and is used to reboil directly the ethylene fractionator kettle following its vaporization and subsequent compression and to cool indirectly the ethylene fractionator overhead condenser.

An object of this invention is to devise a complete and unitary process for separating and recovering ethylene from low boiling hydrocarbon mixtures containing ethylene.

Another object of my invention is to provide such a process for separating and recovering ethylene from such mixtures wherein little extraneous refrigeration is required.

Still another object of my invention is to provide such a process for the separation and recovery of ethylene which yields relatively pure product.

Yet another object of my invention is to provide such a process wherein in addition to the main ethylene product other hydrocarbons in the charge stock are separated as individual hydrocarbon products.

Other objects and advantages of my invention will be realized upon reading the following disclosure which, taken with the attached drawing, respectively describes and illustrates a preferred embodiment.

In the drawing the figure illustrates, in diagrammatic form, one arrangement of apparatus parts for use in carrying out the process of my invention.

Referring now to the drawing, butane, from a source, not shown, is passed via pipe 11 to a conversion system 13 maintained under cracking conditions. From the conversion unit 13 effluent containing for example, methane, ethylene, ethane, propylene, propane, and other hydrocarbons higher boiling than propane, and hydrogen, is cooled and then is passed through a pipe 15 to the inlet of a compressor 17. The gaseous mixture compressed to a pressure somewhat above 400 p. s. i. a. (pounds per square inch absolute) is passed through a conduit 16 into a separating means 19, such as, for example, a fractionating column, in which hydrocarbons boiling higher than propane are separated from the remainder of the gases. The gases boiling higher than propane are removed from the separating means 19 through a pipe 21 for such disposal as desired. The remaining gaseous material consisting of propane, propylene, ethane, ethylene, methane and hydrogen, for the most part, is passed through a conduit 23 to a heat exchanger 25 in which the gas is cooled somewhat by indirect heat exchange with a cold gas subsequently produced. The somewhat cooled gas stream is passed through a conduit 27 to a dehydrating means 29 for removal of moisture. This dehydrating means can be one or more vessels provided with a solid dehydrating material, such as silica gel or the like, or it can be provided with a liquid dehydrating agent such as ethylene glycol, or the like. The dried gaseous mixture is passed from the dehydrating means 29 through a conduit 31 into an evaporative type heat exchanger 33 in which the mixture of gases is cooled to about 34° F. From this exchanger the gases are passed through a conduit 35 to an indirect heat exchanger 37 in which the gases are heat exchanged with a subsequently produced stream of gases. This subsequently produced stream of gases after the heat exchange in exchanger 37, is passed on to exchanger 25 for heat exchange with charged gases as previously mentioned. From exchanger 37 the feed stock gases issue at a temperature of about −4° F. and at this temperature the gases are passed through a conduit 39 into a second evaporative heat exchanger 41. In this latter exchanger the gases are cooled to a temperature of about −18° F. in indirect heat exchange with evaporating $C_3$ hydrocarbons and at this temperature these chilled gases are passed through a conduit 43 to a third evaporative heat exchanger 47 in which heat exchange is effected with vaporizing ethane and the charge issues therefrom at a temperature of about −55° F. At this temperature these gases are passed through a conduit 49 into a demethanizing still 51. As mentioned hereinbefore, the compressor 17 compresses the charge gases to a pressure somewhat above 400 p. s. i. a., the pressure output of this compressor is actually that required to force the gases downstream and to enter the demethanizer at about this 400 p. s. i. a. This demethanizer column is operated under such conditions that a top column temperature of about −70° F. is maintained with a kettle temperature of about +52° F. This kettle temperature is provided by heat exchange furnished by a heating medium passed through a reboiler coil 61.

Overhead gases from the demethanizer column are removed through an overhead vapor line 123 and a liquid $C_3$ hydrocarbon material is added thereto from a line 125, from a source to be described hereinbelow. The mixture of $C_3$ hydrocarbons and the overhead vapors from the demethanizer are passed on to a fourth evaporative heat exchanger 129 in which the mixture is heat exchanged with evaporating liquid ethane from a source to be disclosed. From this latter evaporative heat exchanger the chilled mixed stream is passed on through line 131 into a fifth evaporative heat exchanger 133 in which heat exchange is effected with an additional quantity of liquid ethane from said source, to be disclosed. From this fifth heat exchange step the chilled material is passed through a line 135 into an accumulator vessel 137. From this accumulator, liquid which is largely $C_3$ hydrocarbons is passed through a line 141 under the influence of a pump 145 into the upper portion of the demethanizer, the liquid $C_3$ hydrocarbon material serving a dual purpose therein. First, the $C_3$ stream serves as reflux to cool the top of the column, and second, it provides liquid absorbent for absorbing $C_2$ and $C_3$ hydrocarbons so that all or substantially all of the $C_2$ and $C_3$ hydrocarbons can be removed from the bottom of the demethanizer as liquid.

Bottom material comprising $C_2$ and $C_3$ hydrocarbons is removed from the kettle section of the demethanizer 51 and is passed through a line 53 containing a pressure reducing valve 55 into a deethanizing column 57. The bottoms or rich absorbent material removed from the kettle section of the demethanizer has a temperature of about 52° F. at a pressure of the aforementioned 400 p. s. i. a. On passing through the pressure reducing valve 55 a pressure reduction to about 275 p. s. i. a. is effected and the deethanizer column is operated at about this latter pressure. This column is operated under said pressure in such a manner that a temperature of about —15° F. is maintained in the top of the column and a temperature of about +112° F. in the kettle section. Under these conditions a vaporous overhead product comprising $C_2$ hydrocarbons is removed from the column through a line 167 and is passed to a sixth indirect evaporative heat exchanger 87 in which heat exchange is effected with evaporating liquid $C_3$ hydrocarbons. From this exchanger the deethanizer column overhead is withdrawn at a temperature about —18° F. and is passed through line 169 into an accumulator 171. A portion of the condensate from this accumulator is passed through a line 175 under the influence of a pump 173 into the top of the deethanizer vessel 57 for reflux purposes. The remainder of the condensate is passed through a line 179 containing a pressure reduction valve 181 in which pressure of the condensate is reduced from the accumulator pressure to a pressure of about 169 p. s. i. a. This $C_2$ hydrocarbon product at this latter pressure is then introduced into a still 161 which is operated under conditions to separate ethylene as an overhead product from ethane. A temperature of about —50° F. is maintained in the top of this column and the ethylene overhead product is removed at this temperature and is passed through a line 183 into a seventh evaporative heat exchanger 185 in which heat exchange is effected with evaporating ethane from a source to be described. Further chilled ethylene is removed from exchanger 185 at a temperature of about —54° F. and is passed through a line 187 into an ethylene accumulator 189. Ethylene condensate is passed from this accumulator through a pipe 197 under the influence of a pump 199 into the top of the fractionator 161 for refluxing purposes. Vaporous ethylene is removed from the accumulator 189 and is passed through a pipe 195 for such disposal as desired. The evaporative heat exchanger 185 is operated in such a manner that just sufficient ethylene is condensed as to provide sufficient liquid for refluxing column 161.

Bottoms material from the fractionator 161 is removed therefrom and comprises liquid ethane and is passed through lines 163 and 217 into a run storage tank 201. Line 217 is provided with a pressure reducing valve 218 and the ethane on passing through this valve is reduced in pressure from about 169 p. s. i. a. to about 70 p. s. i. a. with the simultaneous cooling of the ethane from the kettle temperature in column 161 to about —65° F. The ethylene product in pipe 195 has a temperature of about —54° F. and it can be utilized for its available refrigeration, if desired.

The kettle material from the kettle section of the deethanizer column 57 is withdrawn therefrom and is passed through a line 59 into the heat exchanger 61 in the kettle section of the demethanizer 51 for providing reboiling heat. This liquid passed into exchanger 61 from the deethanizer enters exchanger 61 at a temperature of about 112° F. This heat exchanged liquid leaves the reboiler coil 61 and is passed through a line 63 provided with a pressure reducing valve 65 in which pressure is reduced from about 270 p. s. i. a. to about 84 p. s. i. a. with the simultaneous cooling to about 34° F. The liquid $C_3$ hydrocarbon refrigerant in the run tank 67 is maintained under a pressure of about 84 p. s. i. a. and at +34° F.

Liquid $C_3$ hydrocarbon refrigerant from run tank 67 is passed through a line 71 into the first mentioned evaporative heat exchanger 33. Vaporous $C_3$ hydrocarbons are returned from exchanger 33 by way of a line 69 to the surge tank 67. Liquid $C_3$ hydrocarbon refrigerant not vaporized in exchanger 33 is passed therefrom through a line 73 provided with a pressure reducing valve 75 into a surge tank 79. On passing through the pressure reducing valve 75 pressure is reduced sufficiently to drop the temperature on the liquid $C_3$ refrigerant from about +34° F. to about —28° F. The pressures involved in this pressure reduction are approximately 84 p. s. i. a. before pressure reduction and 27 p. s. i. a. after pressure reduction (in tank 79). Liquid $C_3$ hydrocarbons at this latter pressure and at a temperature of about —28° F. are passed through a line 99 into said second evaporative heat exchanger 41. Additional liquid $C_3$ hydrocarbon refrigerant from the surge tank 79 is passed through pipes 77 and 81 into an eighth indirect evaporative heat exchanger 83. Vaporous $C_3$ hydrocarbons produced in exchanger 83 are removed therefrom and are passed though a line 84 into a line 89 and thence into the surge tank 79. Vaporous $C_3$ hydrocarbon from the evaporative heat exchanger 41 is passed through a line 44 into said line 89. Also the vaporous $C_3$ refrigerant hydrocarbon from the evaporative heat exchanger 87 is passed through said line 89 and is combined with the $C_3$ vapors from the lines 84 and 44 and the combined vapors are passed into surge tank 79. Vapors from this surge tank are passed through a line 101, are compressed by compressor 103 and are conducted therefrom in a pipe 217 to a second compressor 107. From this second compressor 107 a portion of the further compressed $C_3$ hydrocarbon vapors are passed through a line 117 to an indirect heat exchanger 111. From this latter exchanger the $C_3$ hydrocarbon stream is passed through a line 113 and is added to the liquid material flowing through pipe 59. The exchanger 111 is a water exchanger and water is conducted to and from said exchanger by pipes 115 for cooling the compressed $C_3$ refrigerant hydrocarbons, with at least some condensation.

The liquid ethane refrigerant system utilizes the ethane bottoms material from the ethylene fractionator 161. This bottoms is withdrawn from fractionator 161 and is passed through pipes 163 and 217 and a pressure reduction valve 218 into run tank 201. This liquid ethane refrigerant is used in several of the evaporative heat exchange steps as hereinbefore mentioned. Thus, liquid ethane from run tank 201 is passed through a pipe 193 to the evaporative heat exchanger 185. Ethane vapors from this exchanger are returned to tank 201 by way of pipe 191. Additional liquid refrigerant is passed from tank 201 by way of pipe 205 to the indirect evaporative heat exchanger 47 and ethane vapors therefrom are returned to the refrigerant storage tank by way of a pipe 121. Liquid ethane from pipe 205 is conducted through a pipe 209 and portions of the ethane are passed into each of two evaporative heat exchangers. One portion of this ethane from pipe 209 is passed through a pipe 207 into exchanger 133 while the remainder is passed through pipe 143 provided with a pressure reduction valve 215 into the evaporative heat exchanger 129. Ethane vapors from exchanger 133 are passed through line 203 and are added to the vapors in line 121. The ethane vapors from exchanger 129 are removed therefrom and are passed by pump 149 through a pipe 147 and a portion of this vaporous material is removed from the system through a pipe 149A as another product of the process. That portion of the ethane flowing through pipe 147 which is not removed as product is passed on through a pipe 150 and is combined with ethane vapors from a pipe 151, this combined ethane stream being compressed by a compressor 153. The ethane vapors in pipe 151 are removed from the vapor space in the refrigerant ethane in run tank 201. The effluent ethane from the compressors 153 is passed through a pipe 155 and a portion thereof is passed on through a pipe 159 and is introduced into the ethylene fractionator 161 to provide reboiling heat. The remainder of the compressed ethane from pipe 155 is passed through a pipe 157 to the coil of the evaporative heat exchanger 83. Ethane withdrawn from this exchanger is passed through a pipe 165 and is combined with the ethane from the fractionator 161 bottoms withdrawn through pipe 163.

Liquid $C_3$ hydrocarbon refrigerant not evaporated in the indirect evaporative heat exchanger 87 is withdrawn therefrom and is passed through a pipe 91 and is mixed with liquid $C_3$ hydrocarbon refrigerant in pipe 93 from exchanger 83, and the mixture is passed on through line 93 to the suction of a pump 95. Pump 95 discharges liquid $C_3$ refrigerant into line 125 to be combined with the demethanizer overhead material flowing through pipe 123. This combined stream passes through the coils of exchangers 129 and 133 and condensate from these two exchangers is received into the accumulator 137. This condensate is removed from tank 137 by pump 145 and is passed through line 141 into the top of the demethanizer 51 to serve the dual purpose of cooling the top of the tower and to provide a liquid absorbent for absorbing $C_2$ and $C_3$ hydrocarbons in the demethanizing operation as hereinbefore mentioned. A portion of the liquid $C_3$ refrigerant flowing through line 93 is withdrawn from this line just prior to pump 95 and is passed through a line 97 as still another product of the process and for such disposal as desired. Liquid $C_3$ hydrocarbons products can, if desired, be removed from one or more other points than outlet line 97 in the system, for example, from lines 59 and/or 113. Liquid $C_3$ hydrocarbon refrigerant not evaporated in the evaporative heat exchanger 41 is passed through a pipe 119 and is added to the $C_3$ refrigerant flowing in line 93 prior to the takeoff pipe 97 and pump 95. Vaporous $C_3$ refrigerant flowing through pipe 117 is divided into two portions, one portion being passed through pipe 109 into the kettle section of the deethanizer column 57 to furnish reboiling heat while the other portion is passed through the water condenser 111 as previously described. A pipe 105 conducts vaporous $C_3$ hydrocarbon refrigerant from run tank 67 to pipe 217 on the inlet side of pump 107. Uncondensed vapors entering the accumulator tank 137 are removed therefrom through a pipe 139 and are passed therefrom to the indirect heat exchanger 37 for supplying a portion of the cooling to the charge stock to the process. This cooling gas is passed from exchanger 37 by way of pipe 213 through heat exchanger 25 as previously described.

A portion of the $C_3$ liquid hydrocarbon refrigerant from the run tank 79 is passed through pipe 77 and pipe 85 into the evaporative heat exchanger 87.

As an example of the operation of the process of my invention the following tabulation gives run data wherein butane is cracked by a noncatalytic cracking operation to produce a mixture of vaporous material comprising $H_2$, $CH_4$, $C_2H_4$, $C_2H_6$, $C_3H_6$, $C_3H_8$ and a very minor amount of higher boiling hydrocarbons. When such a stock is compressed by a compressor corresponding to compressor 17 and is treated in a treater corresponding to treater 19 hydrocarbons boiling above propane are removed as bottoms while the propane, lower boiling hydrocarbons and hydrogen are passed on for treatment according to the process of my invention. In addition to the ethylene product a gaseous product comprising hydrogen and methane is produced along with an ethane product and a $C_3$ hydrocarbon mixture as separate products. The $C_3$ hydrocarbon and the ethane products are used in separate internal refrigeration systems for various operations requiring low temperatures. The off gases, that is, the hydrogen and methane gas stream, are utilized for their refrigeration value and about the only additional coolant required is water for use in exchanger 111. In the tabulation the first column contains reference numerals indicating the various apparatus parts in which the materials in process possess the corresponding pressures and temperatures.

| Apparatus Reference No. | P. s. i. a. | Temp., °F. |
|---|---|---|
| 16 | +400 | 100 |
| 23 |  | 100 |
| 27 |  | 70 |
| 35 |  | 44 |
| 39 |  | −4 |
| 43 |  | −43 |
| 49 |  | −55 |
| 51 | 400 | −70 (top) |
| 51 |  | +52 (bottom) |
| 137 |  | −112 |
| 57 | 275 | −15 (top) |
| 57 |  | 112 (bottom) |
| 67 | 84 | 34 |
| 171 | 270 | −18 |
| 161 | 169 | −50 (top) |
| 217 | 169 | −18 |
| 213 |  | +2 |
| 215 |  | 90 |
| 117 | 275 |  |
| 139 |  | −112 |
| 189 | 165 | −54 |
| 201 | 70 | −65 |
| 133 | 70 | −65 |
| 185 | 70 | −65 |
| 47 | 70 | −65 |
| 129 | 18 | −120 |
| 149 |  | +112 |
| 155 | 174 | 46 |
| 67 | 84 | 34 |
| 73 |  | 34 |
| 33 |  | 34 |
| 79 | 27 | −28 |
| 41 | 27 | −28 |
| 87 | 27 | −28 |
| 83 | 27 | −28 |
| 217 | 84 |  |

Materials of construction for the apparatus and equipment illustrated herein can, in general, be selected from among those commercially available, taking into account pressures and temperatures involved in such an operation. Many valves, pressure and temperature indicating, recording, and controlling apparatus and such other auxiliary apparatus as is ordinarily required in such an operation is not shown on the drawing nor described in the specification for purposes of brevity and simplicity. The need for such auxiliary equipment, its installation, use and operation are well understood by those skilled in the art.

While certain embodiments of the invention have been described for details illustrated, this invention is not limited thereto.

I claim:

1. A process for the recovery of ethylene from a vaporous mixture containing ethylene at a superatmospheric pressure comprising the steps of separating $C_4$ and higher boiling hydrocarbons from said vaporous mixture and recovering these $C_4$ and higher boiling hydrocarbons as one product of the process, chilling the propane and lower boiling hydrocarbons and hydrogen, fractionating this chilled stream of propane and lower boiling hydrocarbons and hydrogen in a demethanizing operation to produce an overhead intermediate product comprising methane and a bottom product comprising $C_2$ and $C_3$ hydrocarbons, reducing the pressure of the $C_2$ and $C_3$ hydrocarbon bottom material from said demethanizing operation and fractionating same in a deethanizing operation to produce an overhead intermediate product comprising ethane and ethylene and a bottom intermediate product comprising $C_3$ hydrocarbons, condensing the ethane-ethylene overhead intermediate product, returning a portion of the ethane-ethylene condensate to reflux the deethanizing operation, reducing the pressure on the remainder of the ethane-ethylene condensate and fractionating same to produce an overhead intermediate ethylene product and an ethane bottoms product, withdrawing this latter ethane as one product of the process, condensing a portion of said overhead intermediate ethylene product, returning this condensate into the ethylene-ethane fractionating operation to reflux same, withdrawing the uncondensed portion of the ethylene as the main product of the process, withdrawing the C₃ hydrocarbon bottom product from said deethanizing operation and passing same in indirect heat exchange with the kettle material in said demethanizing operation to reboil same, withdrawing the C₃ hydrocarbon bottom product from the demethanizing reboiling operation, introducing a portion of this withdrawn liquid C₃ product into the upper portion of said demethanizing operation to supply liquid absorbent and reflux for said demethanizing operation, and withdrawing the remainder of the C₃ hydrocarbon as another product of the process.

2. A process for the recovery of ethylene from a vaporous mixture containing ethylene at a superatmospheric pressure comprising the steps of separating C₄ and higher boiling hydrocarbons from said vaporous mixture and recovering these C₄ and higher boiling hydrocarbons as one product of the process, chilling the propane and lower boiling hydrocarbons and hydrogen by a first indirect heat exchange step with a cold gas as subsequently produced, further chilling the remaining propane and lower boiling gases by a first and a second indirect evaporative heat exchange operation with a liquid C₃ hydrocarbon refrigerant as subsequently produced, further chilling the further cooled material by a third indirect evaporative heat exchange operation with a liquid ethane refrigerant subsequently produced, fractionating this further chilled stream of propane and lower boiling hydrocarbon and hydrogen in a demethanizing operation to produce an overhead intermediate product comprising methane and a bottom product comprising C₂ and C₃ hydrocarbons, chilling said intermediate product comprising methane in a fourth indirect evaporative heat exchange operation with additional liquid ethane refrigerant as subsequently produced, further chilling said intermediate product comprising methane in a fifth indirect evaporative heat exchange operation with additional liquid ethane refrigerant subsequently produced, returning condensate produced by said fourth and fifth heat exchange operations as reflux into said demethanizing operation, passing the uncondensed material from said fourth and fifth indirect heat exchange operations to said first heat exchange step as said cold gas as subsequently produced, reducing the pressure of the C₂ and C₃ hydrocarbon bottom material from said demethanizing operation to about 275 p. s. i. a. and fractionating same in a deethanizing operation to produce an overhead intermediate product comprising ethane and ethylene and a bottom intermediate product comprising C₃ hydrocarbons, condensing the ethane-ethylene overhead intermediate product in a sixth indirect evaporative heat exchange operation with additional liquid C₃ refrigerant as subsequently produced, returning a portion of the ethane-ethylene condensate to reflux the deethanizing operation, reducing the pressure on the remainder of the ethane-ethylene condensate to a pressure of about 169 p. s. i. a. and fractionating same to produce an overhead intermediate ethylene product and a bottom intermediate ethane product, condensing a portion of said overhead intermediate ethylene product by a seventh indirect evaporative heat exchange with additional liquid ethane refrigerant as subsequently produced, returning this condensate into the ethylene-ethane fractionating operation to reflux same, withdrawing the uncondensed portion of the ethylene as the main product of the process, withdrawing said bottom intermediate ethane product and reducing its pressure and simultaneously lowering its temperature to produce said liquid ethane refrigerant as subsequently produced, removing as another product of the process a portion of the ethane vapors from said third, fourth, fifth and seventh indirect evaporative heat exchange operations, compressing the remainder of the ethane vapors from said third, fourth, fifth and seventh indirect evaporative heat exchange operations and condensing at least a portion of this compressed ethane in an eighth indirect evaporative heat exchange operation with additional liquid C₃ refrigerant as subsequently produced and adding this condensed ethane to the with- drawn bottom intermediate ethane product prior to its pressure reduction, passing the remaining portion of said compressed ethane into the ethylene-ethane fractionating operation to reboil same, withdrawing the C₃ hydrocarbon bottom product from said deethanizing operation and passing same in indirect heat exchange with the kettle material in said demethanizing operation to reboil same, withdrawing said C₃ hydrocarbon bottom product from the demethanizing reboiling operation, reducing the pressure on and simultaneously cooling the C₃ hydrocarbon bottom product withdrawn from the demethanizing reboiling operation to produce said liquid C₃ hydrocarbon refrigerant, passing this liquid C₃ hydrocarbon refrigerant to said first, second and sixth indirect evaporative heat exchange operations as said liquid C₃ refrigerant as subsequently produced, compressing the evaporated C₃ refrigerant hydrocarbon from said first, second and sixth indirect evaporative heat exchange operations and introducing a portion of this compressed C₃ refrigerant into said deethanizing operation to reboil same, condensing the remainder of the compressed C₃ refrigerant and adding the condensate to the withdrawn kettle product from said deethanizing operation, withdrawing liquid C₃ refrigerant from said second indirect evaporative heat exchange operation and introducing a portion of this withdrawn liquid C₃ refrigerant into the upper portion of said demethanizing operation to supply liquid absorbent and reflux for said demethanizing operation, and withdrawing the remainder of the C₃ hydrocarbons as another product of the process.

3. A process for the recovery of ethylene from a vaporous mixture containing ethylene and propane and other hydrocarbons lower boiling than propane, and hydrogen, comprising chilling this vaporous mixture, fractionating this chilled stream of propane and lower boiling hydrocarbons and hydrogen in a demethanizing operation to produce an overhead intermediate product comprising methane and a bottom product comprising C₂ and C₃ hydrocarbons, reducing the pressure of the C₂ and C₃ hydrocarbon bottom material from said demethanizing operation and fractionating same in a deethanizing operation to produce an overhead intermediate product comprising ethane and ethylene and a bottom intermediate product comprising C₃ hydrocarbons, condensing the ethane-ethylene overhead intermediate product, returning a portion of the ethane-ethylene condensate to reflux the deethanizing operation, reducing the pressure on the remainder of the ethane-ethylene condensate and fractionating same to produce an overhead intermediate ethylene product and an ethane bottoms product, withdrawing this latter ethane as one product of the process, condensing a portion of this overhead intermediate ethylene product, returning this condensate into the ethylene-ethane fractionating operation to reflux same, withdrawing the uncondensed portion of the ethylene as the main product of the process, withdrawing the C₃ hydrocarbon bottom product from said deethanizing operation and passing same in indirect heat exchange with the kettle material in said demethanizing operation to reboil same, withdrawing said C₃ hydrocarbon bottom product from the demethanizing reboiling operation, introducing a portion of this withdrawn liquid C₃ into the upper portion of said demethanizing operation to supply liquid absorbent and reflux for said demethanizing operation, and withdrawing the remainder of the C₃ hydrocarbons as another product of the process.

4. A method for separating and recovering methane, C₂ hydrocarbons and C₃ hydrocarbons from a mixture comprising methane, ethane, ethylene, propane and propylene, comprising introducing said mixture into a demethanizing zone, withdrawing an overhead material from said demethanizing zone, cooling this overhead material to form condensate, withdrawing uncondensed overhead material comprising methane as one product of the process, reboiling said demethanizing zone with a liquid C₃ hydrocarbon material as subsequently produced, withdrawing demethanizer bottom material from the demethanizer zone and introducting it into a deethanizing zone, removing $C_2$ hydrocarbons overhead from said deethanizing zone, condensing this $C_2$ hydrocarbon overhead material and returning at least a portion of the condensate into the deethanizing zone to reflux same, and removing the remainder of the condensate, removing liquid $C_3$ hydrocarbon bottoms from said deethanizing zone, and passing same in indirect heat exchange with the kettle section of said demethanizing zone as said liquid $C_3$ hydrocarbon material as subsequently produced, withdrawing said $C_3$ hydrocarbon material from the indirect heat exchange with said kettle section and separating the $C_3$ hydrocarbon material into a vapor phase and a liquid phase, introducing at least a portion of the $C_3$ hydrocarbon liquid phase as reflux and absorbent into said demethanizing operation, compressing the separated $C_3$ hydrocarbon vapor phase and introducing compressed $C_3$ hydrocarbon vapor phase into the kettle section of said deethanizing zone as a direct heat exchange medium to add reboiling heat thereto.

5. A process for the recovery of ethylene from a mixture containing ethylene, ethane, propane and other hydrocarbons lower boiling than propane, and hydrogen, comprising, fractionating said mixture in a demethanizing operation to produce a bottoms material comprising $C_2$ and $C_3$ hydrocarbons, fractionating this $C_2$ and $C_3$ hydrocarbon bottoms material in a deethanizing operation to produce an ethylene and ethane containing overhead stream and a $C_3$ hydrocarbon containing bottoms, fractionating said ethylene and ethane containing overhead stream and thereby producing an ethylene product of the process and an ethane bottoms as another product, withdrawing the $C_3$ hydrocarbon containing bottoms material from said deethanizing operation and passing same in indirect heat exchange with kettle material in said demethanizing operation to reboil same, withdrawing said $C_3$ hydrocarbon material from said demethanizing reboiling operation, separating a portion of this $C_3$ hydrocarbon material withdrawn from said reboiling operation, cooling this separated portion of $C_3$ hydrocarbon material and passing this cooled portion into said demethanizing operation as an absorbent, and removing the remainder of said $C_3$ hydrocarbon material withdrawn from said reboiling operation as another product of the process.

6. A process for the purification of ethylene from a mixture containing ethylene, propane and other hydrocarbons lower boiling than propane, and hydrogen, comprising, fractionating said mixture in a demethanizing operation to produce a bottoms material comprising $C_2$ and $C_3$ hydrocarbons, fractionating this $C_2$ and $C_3$ hydrocarbon bottoms material to produce a stream comprising ethylene and a $C_3$ hydrocarbon containing bottoms material, withdrawing the $C_3$ hydrocarbon containing bottoms material from the second fractionating operation and passing same in indirect heat exchange with kettle material in said demethanizing operation to reboil same, withdrawing said $C_3$ hydrocarbon material from the demethanizing reboiling operation, separating a portion of this $C_3$ hydrocarbon material withdrawn from said reboiling operation, cooling this separated portion of $C_3$ hydrocarbon material and passing this cooled portion into said demethanizing operation as an absorbent, and removing the remainder of said $C_3$ hydrocarbon material withdrawn from said reboiling operation as another product of the process.

7. A process for the purification of ethylene from a mixture containing ethylene, ethane, propane, and other hydrocarbons lower boiling than propane, and hydrogen, comprising, fractionating said mixture in a demethanizing operation to produce a bottoms comprising $C_2$ and $C_3$ hydrocarbons, fractionating these $C_2$ and $C_3$ hydrocarbon bottoms in a deethanizing operation to produce an ethylene and ethane containing overhead stream and a $C_3$ hydrocarbon containing bottoms, fractionating said ethylene and ethane containing overhead stream and therefrom producing an ethylene product of the process and an ethane bottoms as another product, withdrawing the $C_3$ hydrocarbon containing bottoms from said deethanizing operation and passing same in indirect heat exchange with the kettle material in said demethanizing operation to reboil same, withdrawing said $C_3$ hydrocarbon material from the demethanizing reboiling operation, separating a portion of this $C_3$ hydrocarbon material withdrawn from said reboiling operation, cooling the separated portion of $C_3$ hydrocarbon material and passing this cooled portion into said demethanizing operation as an absorbent, separating another portion of said $C_3$ hydrocarbon material withdrawn from said reboiling operation and passing said another portion of said $C_3$ hydrocarbon material in direct heat exchange with kettle material in said deethanizing operation, and removing the remainder of said $C_3$ hydrocarbon material withdrawn from said reboiling operation as another product of the process.

8. A process for the purification of ethylene from a mixture containing ethylene, propane and other hydrocarbons lower boiling than propane, and hydrogen, comprising fractionating said mixture in a demethanizing operation to produce a bottoms comprising $C_2$ and $C_3$ hydrocarbons, fractionating these $C_2$ and $C_3$ hydrocarbon bottoms in a deethanizing operation to produce a stream comprising ethylene and a $C_3$ hydrocarbon containing bottoms, withdrawing the $C_3$ hydrocarbon containing bottoms from said deethanizing operation and passing same in indirect heat exchange with the kettle material in said demethanizing operation to reboil same, withdrawing said $C_3$ hydrocarbon material from the demethanizing reboiling operation, separating a portion of this $C_3$ hydrocarbon material withdrawn from said reboiling operation, cooling this separated portion of $C_3$ hydrocarbon material and passing this cooled portion into said demethanizing operation as an absorbent, separating another portion of said $C_3$ hydrocarbon material withdrawn from said reboiling operation and passing said another portion of said $C_3$ hydrocarbon material in direct heat exchange with kettle material in said deethanizing operation, and removing the remainder of said $C_3$ hydrocarbon material withdrawn from said reboiling operation as another product of the process.

References Cited in the file of this patent

UNITED STATES PATENTS

| | | |
|---|---|---|
| 2,600,110 | Hachmuth | June 10, 1952 |
| 2,619,814 | Kniel | Dec. 2, 1952 |